(12) United States Patent
Ulrich

(10) Patent No.: US 8,120,482 B2
(45) Date of Patent: Feb. 21, 2012

(54) SYSTEM AND METHOD OF ENHANCED RFID TRANSPORT DEVICE SENSOR NETWORK

(75) Inventor: Richard Bennett Ulrich, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 339 days.

(21) Appl. No.: 12/197,059

(22) Filed: Aug. 22, 2008

(65) Prior Publication Data

US 2009/0212915 A1 Aug. 27, 2009

Related U.S. Application Data

(60) Provisional application No. 60/957,767, filed on Aug. 24, 2007.

(51) Int. Cl.
*G08B 1/08* (2006.01)
(52) U.S. Cl. ............. 340/539.22; 340/5.92; 340/539.13; 340/539.23; 340/572.1; 235/384; 235/385; 700/215; 700/217
(58) Field of Classification Search .................. 340/5.92, 340/572.1, 572.4, 539.13, 539.21–539.23, 340/573.1, 825.49, 8.1; 235/385, 384; 705/28, 705/330, 333; 700/213–215, 217, 219, 221, 700/224
See application file for complete search history.

(56) References Cited

U.S. PATENT DOCUMENTS

| | | | | |
|---|---|---|---|---|
| 5,886,634 | A * | 3/1999 | Muhme | 340/572.1 |
| 6,429,810 | B1 * | 8/2002 | De Roche | 342/357.75 |
| 7,161,489 | B2 | 1/2007 | Sullivan et al. | |
| 7,242,306 | B2 * | 7/2007 | Wildman et al. | 340/573.1 |
| 7,423,535 | B2 * | 9/2008 | Chung et al. | 340/572.4 |
| 7,639,135 | B2 * | 12/2009 | Arms et al. | 340/573.1 |
| 7,675,412 | B2 * | 3/2010 | Adra | 340/539.13 |
| 2003/0227392 | A1 * | 12/2003 | Ebert et al. | 340/825.49 |
| 2005/0253704 | A1 | 11/2005 | Neuwirth | |
| 2006/0145837 | A1 * | 7/2006 | Horton et al. | 340/539.13 |
| 2006/0170565 | A1 * | 8/2006 | Husak et al. | 340/825.49 |
| 2006/0229895 | A1 * | 10/2006 | Kodger | 705/1 |
| 2006/0238334 | A1 * | 10/2006 | Mangan et al. | 340/539.13 |

OTHER PUBLICATIONS

International Search Report of Application No. PCT/US08/74255, dated Nov. 13, 2008.

* cited by examiner

*Primary Examiner* — George Bugg
*Assistant Examiner* — Anne Lai
(74) *Attorney, Agent, or Firm* — Kenyon & Kenyon LLP

(57) ABSTRACT

A mobile sensor system and method for managing inventory of a store includes at least one radio frequency identification (RFID) scanner for receiving readings from RFID tags, at least one external sensors for detecting at least one external events other than RF signals from the RFID tags, and a processor configured to update an RFID database for storing the readings from the RFID tags, wherein the update is based on a correlation function of the readings from the RFID tags and the external events detected at the at least one external sensors.

18 Claims, 5 Drawing Sheets

SYSTEM AND METHOD OF ENHANCED RFID TRANSPORT DEVICE SENSOR NETWORK

CROSS-REFERENCE TO RELATED APPLICATIONS

This application claims priority to U.S. Provisional Patent Application No. 60/957,767, filed Aug. 24, 2007, entitled "Systems, Methods, and Apparatuses Using RFID Technology," which is herein incorporated by reference in its entirety.

FIELD OF THE INVENTION

The present invention relates to a system and method for managing inventories in a store using Radio Frequency Identification (RFID) tags. In particular, the present invention relates to a system and method of using additional non-RFID sensors, e.g., proximity sensors, to detect stray RFID tag recordings in the store.

BACKGROUND INFORMATION

A store, e.g., like Wal-Mart Stores, may manage its inventories using a certain coding system, e.g., conventional barcode systems. In such a system, inventories may be encoded with barcodes and stored in a database before or upon their arrival at the store. Later, when a product in the inventory is sold to a customer, the product may be deducted from the inventory based on the barcode scan at a checkout counter. Within a store, products in the inventories may be first stored in a storage or backroom before being moved to shelves in front. Since barcodes are passive labels attached to products, barcodes may not identify locations, e.g., spots or shelves in a store, of these products in the store.

RFID recently emerged as a technology of choice for store inventory management. For example, U.S. patent application, entitled "RFID Promotional Compliance", filed on even date, by Richard Ulrich (incorporated herein by reference), describes a method of managing promotional merchandise displays using RFID tags. In such a system, locational RFID tags may be placed on locational spots, e.g., pallets, shelves or ground areas, to uniquely identify the geometrical locations with RFID tag identifications. Further, the geometrical locations and their corresponding RFID tag identifications may be entered into an RFID database, e.g., manually, to map out the store in terms of RFID tags. RFID tags may also be placed on products to uniquely identify individual products or groups of products, e.g., a group of products on a pallet. When products are placed in a location within a store, e.g., on a pallet in the storage or on a shelf in the front, an RFID scanner may read both the product RFID tags and nearby locational RFID tags simultaneously. By comparing the product RFID tags and simultaneously-read locational RFID tags with information stored in the RFID tag database, the store may conveniently locate the placement of merchandise in the inventory.

SUMMARY

An RFID scanner, e.g., a Gen-2 scanner, may read an RFID tag from a relatively far distance, e.g., 3 to 5 meters away. In a store where a lot of products and locational spots are attached with RFID tags, it is likely that the RFID scanner may pick up many locational and product RFID tag signals other than the intended target RFID tag signals. These unintended RFID tag readings are commonly referred to as stray readings which may make a determination of intended RFID tags difficult. Therefore, there is a need for a system and method to effectively detect stray RFID readings in an RFID-enabled store.

Besides RFID tags and sensors, other types of sensors presently exist for supplying information about a store environment. For example, proximity sensors may detect the presence of nearby objects. In some situations, proximity sensors may be used as load sensors to detect whether a load has been applied to a surface, e.g., flatbed of a transport device. Motion sensors or accelerometers may detect movements of objects and additionally, directions of movements. Laser sensors may be used as range sensors to detect the distance from an object. These existing external sensors may provide independent information to help detect stray RFID readings.

The present invention provides a system and method using additional sensors from an external source, e.g., proximity sensors, to supplement RFID tag readings for a robust determination of target RFID tags to be stored in an RFID database for store inventory management. According to one example embodiment of the present invention, a transport device, e.g., a forklift for moving merchandise in a store, may be equipped with an RFID scanner and external sensors, e.g., a proximity sensor for detecting a load on the forklift. The load information may then be combined with the RFID signal readings for a more accurate determination of target RFID tags. In one embodiment of the present invention, the load information of, e.g., whether a load has been loaded onto or off a forklift, may provide a time window within which the target RFID tag may be extracted. In another embodiment of the present invention, the motion information, e.g., the forklift's directional movements, may provide directional information which in combination with RFID signal strengths, may winnow down unwanted RFID tag readings.

Further, the present invention provides a method to represent a group of RFID tags on a carriage, e.g., a pallet with a "virtual" pallet RFID tag. After a determination that a group of RFID tags belong to a pallet, a virtual pallet RFID tag may be assigned to the group of tags and recorded in the RFID database. The virtual tag may be, e.g., the tag that was read the most number of times during a time window. This virtual pallet tag may be useful since an RFID tag attached to the pallet, i.e., the pallet tag, may not always be readable. The virtual pallet RFID may help locate a pallet when the pallet tag is not readable.

DETAILED DESCRIPTION OF EXAMPLE EMBODIMENTS

Figure 1:
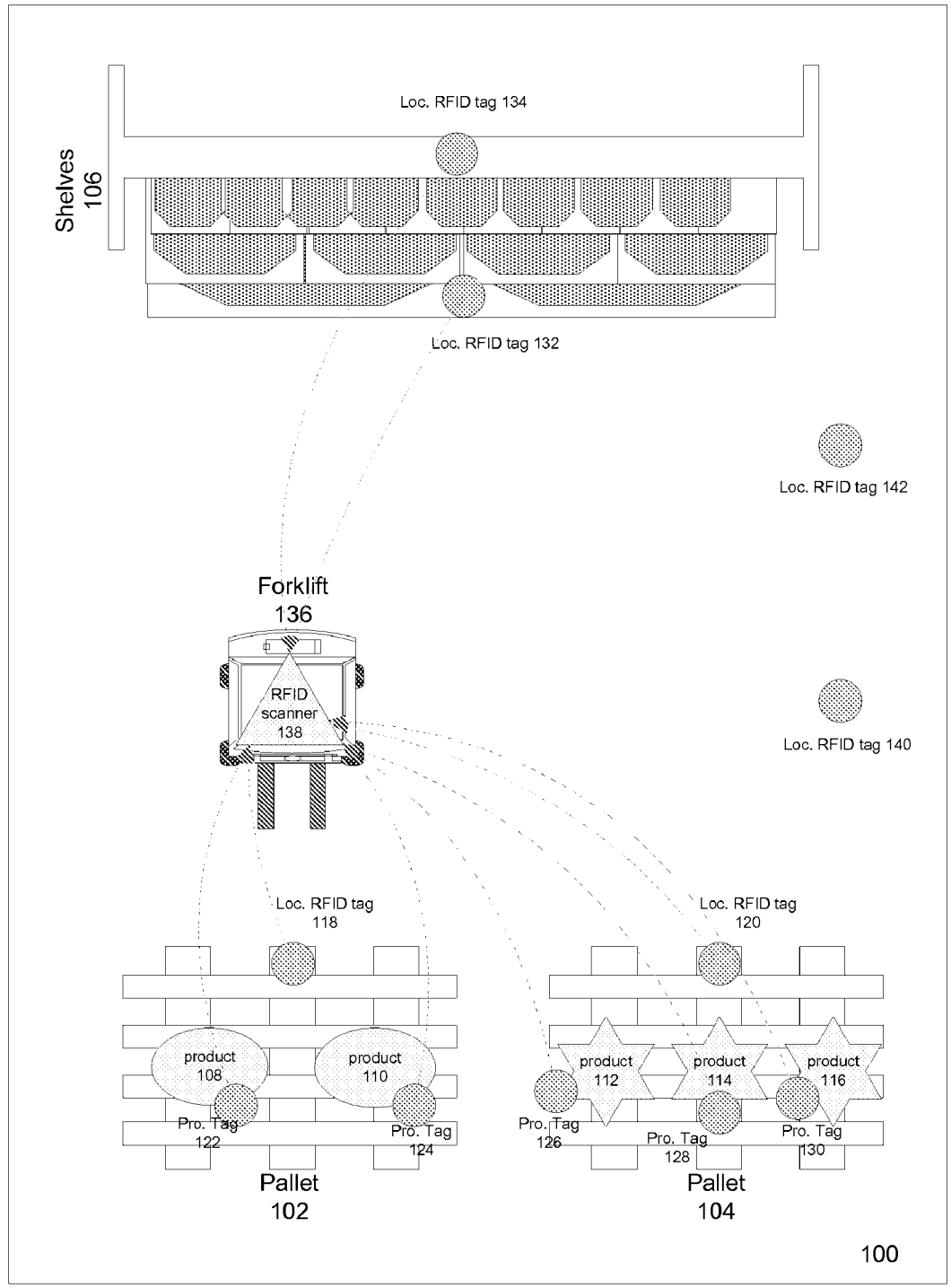
FIG. 1 shows an example store situation where a transport device (forklift) equipped with an RFID reader is moving merchandise from a first location to a second location according to one example embodiment of the present invention.

FIG. 1 shows an example store situation where a transport device (forklift) equipped with an RFID reader is moving merchandise from a first location (pallets) to a second location (shelves) according to one example embodiment of the present invention. A store 100 may include locational spots for storing merchandise, e.g., pallets 102, 104, and/or for displaying merchandise, e.g., shelves 106. Each of the locational spots may be attached with at least one locational RFID tags whose identification number may be used for identifying the locational spots in an RFID tag database. For example, locational RFID tags 118 and 120 may be attached to pallets 102 and 104 respectively, tags 132 and 134 may be attached to shelves 106 for identifying locational spots of lower and upper shelves 106, and tags 140 and 142 may be attached to ground areas for placing pallets or shelves. A store employee may attach locational RFID tags to the corresponding locational spots and record the locational RFID tag readings, e.g., a unique tag identification, in an RFID database.

Merchandise with RFID tags may be placed on each locational spot. For example, products 108 and 110 with product RFID tags 122 and 124 respectively may be placed on pallet 102, and products 112, 114 and 116 with product RFID tags 126, 128 and 130 respectively may be placed on pallet 104. The product RFID tags may be attached on merchandise before they are shipped to the store. Furthermore, the product RFID tags may be scanned and associated with locational RFID tags based on, e.g., timings of reading product RFID tags and locational tags. The product RFID tags and their associations with locational RFID tags may also be recorded in the RFID database for identifying a product location based on the associations.

During the normal operation of a store, merchandise may be moved around from one location, e.g., storage, to another location, e.g., shelves. A transport device, e.g., a forklift 136, may be used to move merchandise or pallets with merchandise from one place to another. When merchandise or a pallet is moved, its corresponding location within the store may be changed as well. Consequently, the RFID tag database may need to be updated to reflect the changed locations. This same operational movement of products may exist in a warehouse or a Distribution Center so the invention will work for either as well.

According to one example embodiment of the present invention, a transport device, e.g., a forklift 136, may be equipped with an RFID scanner 138 to provide an automated way for recording product RFID tag movements. This may be accomplished by correlating product RFID tags with locational RFID tags based on RFID readings from the mobile RFID scanner 138 after a movement. For example, pallet 102 with products 108, 110 may be moved to the area 140. By correlating RFID readings of tags 118, 122, 124 and 140 of the RFID scanner 138 after the move, the location of products 108, 110 and the pallet 102 may be determined to be at location 140, and correspondingly updated in the RFID database.

In a store with many locational and product RFID tags, at anytime, the mobile RFID scanner 138 may receive many RFID signals other than the target RFID tags. In this example embodiment, when the forklift 136 lifts pallet 102, the RFID scanner 138 may receive RF signals from target RFID tags 118, 122 and 124. At the same time, scanner 138 may also receive RF signals from nearby RFID tags on pallet 104, e.g., tags 120, 112, 114 and 116. The RF signals from tags 120, 112, 114 and 116 are not intended RFID tags and cause stray RFID readings.

Figure 2:
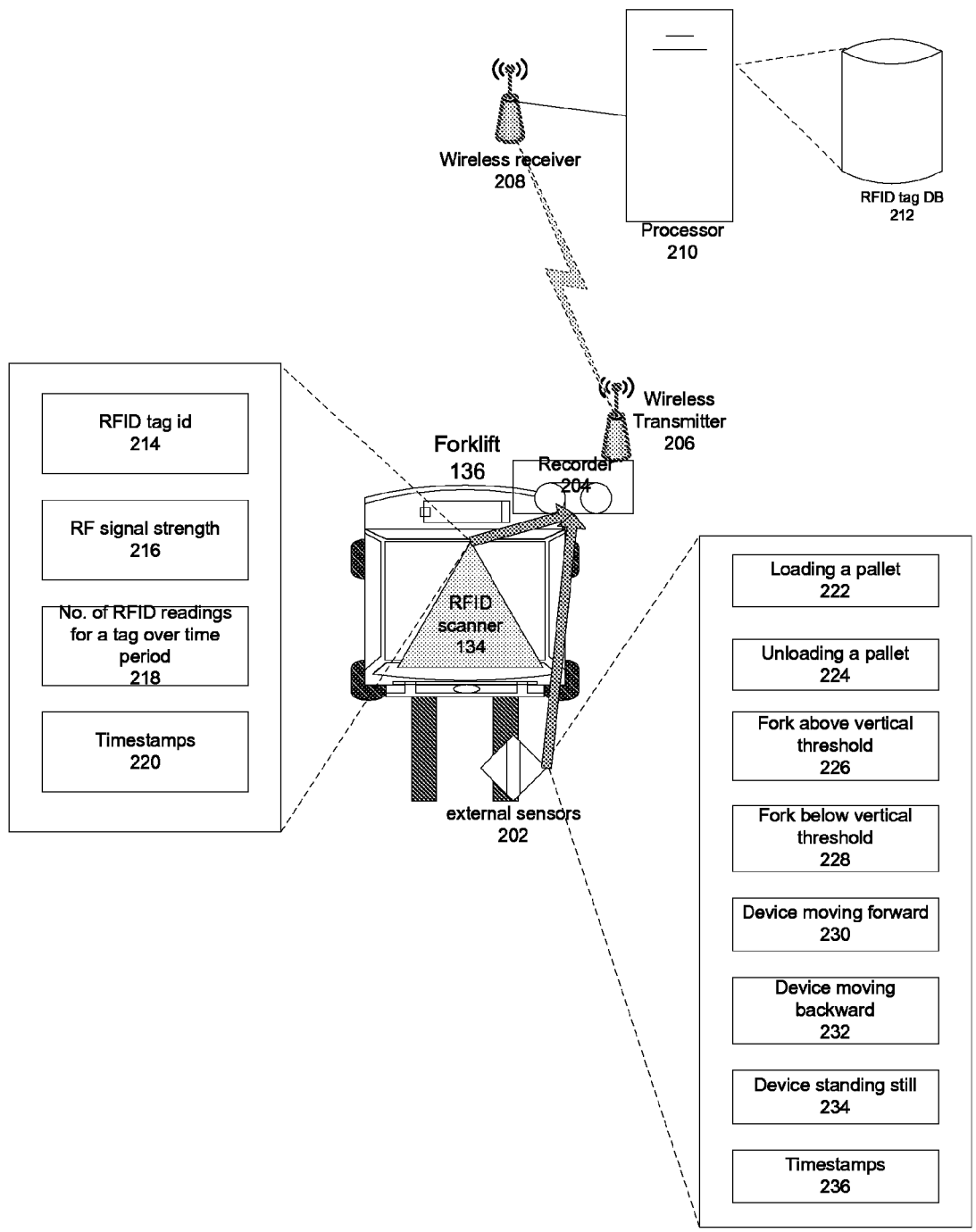
FIG. 2 shows an example RFID transport device sensor system for detecting stray RFID tag readings with additional external sensor information according to one example embodiment of the present invention.

FIG. 2 shows an example RFID transport device sensor system for detecting stray RFID tag readings with additional external sensor information according to one example embodiment of the present invention. In this example embodiment, in addition to the RFID scanner 134, the transport device 136 may also be equipped with at least one external sensors for detecting information other than RF signals. In one example embodiment of the present invention, the external sensor 202 may include proximity sensors for detecting whether a load is on or off the forklift 136. The proximity sensor may be located, e.g., on top of the RFID scanner and on the front of the forklift, for a determination of whether an object, e.g., a pallet, is being picked up or dropped off by the forklift. Further, example external sensors 202 may also include laser sensors mounted, e.g., at the bottom of the forks. A laser sensor may measure the distance of the forks to a surface, e.g., ground, for a determination of the height of the pallet during a pick-up or drop-off operation. Still further, example external sensors may include accelerometers for measuring parameters related to the movement, i.e., speed and direction, e.g., moving forward or backward, of the forklift 136.

The RFID scanner 134 may simultaneously receive and record RFID tag identifications 214 and RF signal strength 216. Additionally, the RFID scanner 136 may also record timestamps 220 at which an RF signal emitted from a tag is received. Based on these timestamps, the number of RF signal readings for a particular tag 218 may be calculated. The external sensor may detect different events related to the forklift, e.g., events of loading a pallet 222, unloading a pallet 224, fork above a vertical threshold 226, fork below a vertical threshold 228, forklift moving forward 230, forklift moving backward 232, and forklift standing still. The external sensors may also detect other information, e.g., speed and direction of movement of the forklift. Additionally, the external sensors may record timestamps at which external events are detected by the external sensors.

In one example embodiment of the present invention, the forklift may also be equipped with a data recorder 204 for recording RFID tag information from the RFID scanner 134 and external sensor events detected at external sensors 202. Both the RFID tag information and external sensor events may be transmitted to a processor 210, e.g., a computer, for a robust determination of target RFID tags. In one example embodiment, the processor 202 may be on board the forklift and be directly linked to the data recorder 204. In another example embodiment of the present invention, the transmission may be carried out over wireless links, e.g., from a wireless transmitter 206 connected to the data recorder 204 to a wireless receiver 208 connected to the processor 210. The wireless transmission may transmit data instantaneously upon they are recorded at the data recorder 204. In an alternative embodiment of the present invention, the data recorder 204 may transmit data to the processor when the forklift finishes moving merchandise and is back to a dock station. Then the data may be transferred through a computer-readable medium, e.g., a portable disk.

The processor 210 may further execute computer software codes for detecting stray RFID readings and determining the location of target RFID tags. Based on the determination, the processor 210 may cause an update of the RFID database 212 to reflect the current merchandise or pallet locations.

Figure 3:
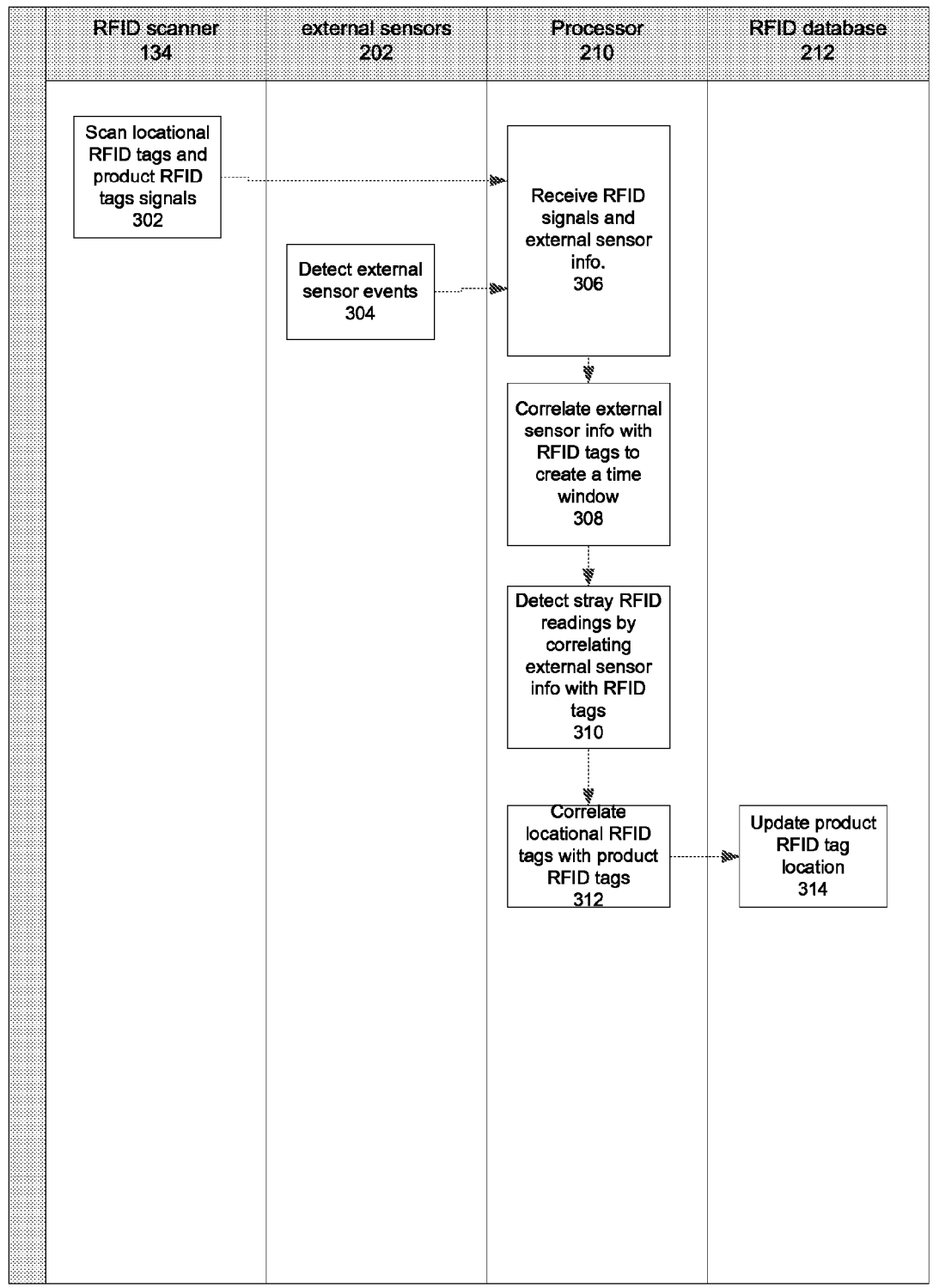
FIG. 3 shows an example RFID transport device sensor method for detecting stray RFID tag readings with additional external sensor information according to one example embodiment of the present invention.

FIG. 3 shows an example RFID transport device sensor method for detecting stray RFID tag readings with additional external sensor information according to one example embodiment of the present invention. As discussed above, the RFID scanner 134 may scan RFID tag information from locational RFID tags and product RFID tags 302, and the external sensors may capture external sensor information 304. At 306, the collected RFID tag information and external sensor information may be transferred to a processor 210.

Figure 5:
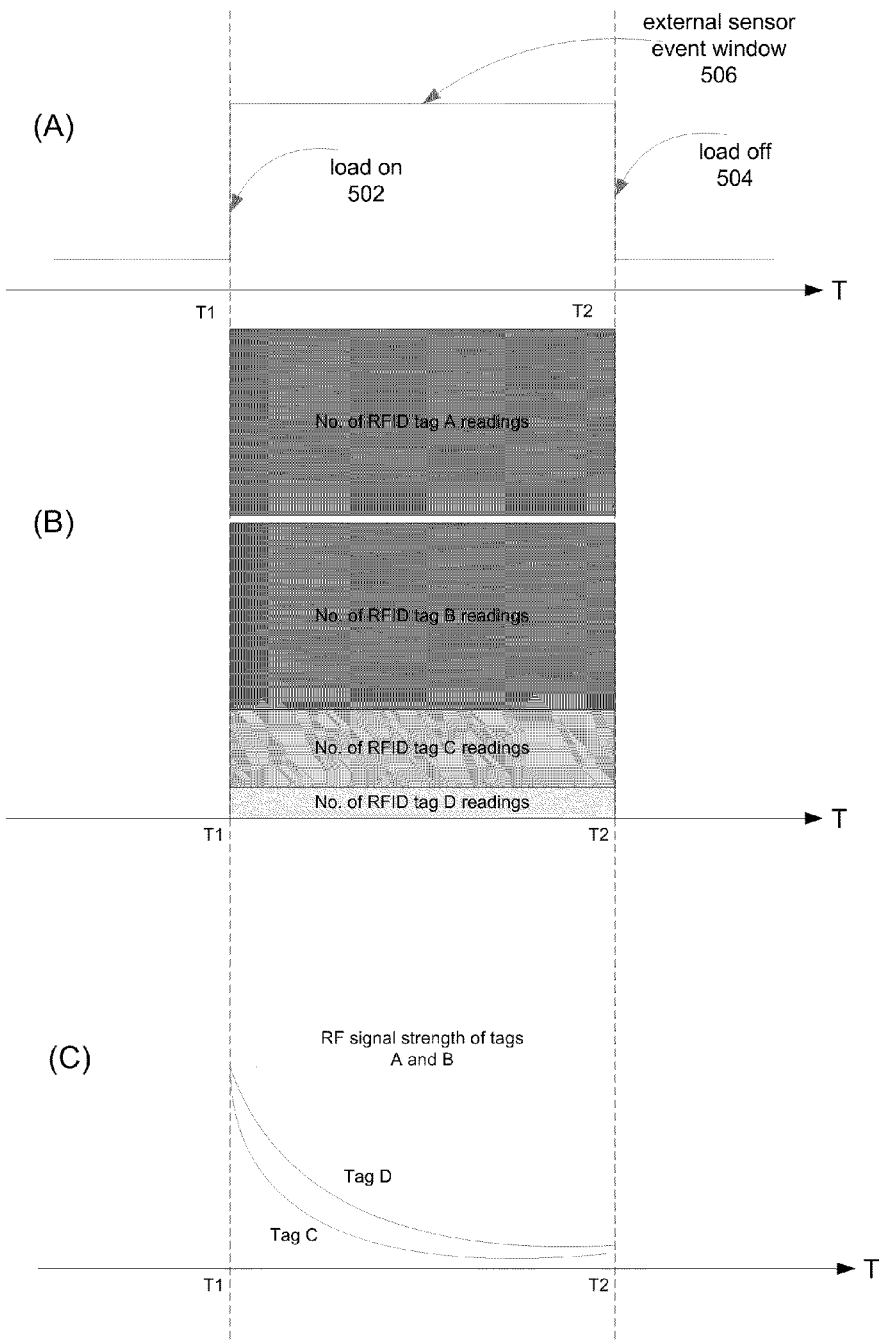
FIG. 5 shows an example of external sensor information associated with numbers of RFID tag readings and RFID signal strengths according to one example embodiment of the present invention.

In one example embodiment of the present invention, external sensor events detected at external sensors may be used to create a time window over which target RFID tags may be detected 308. FIG. 5(A) illustrates an example embodiment of the present invention where the load on a forklift may be used as an external event. At time T1, an external sensor, e.g., a proximity sensor, may detect a "load on" 502 event as the beginning of the external sensor event window 506. At time T2, the external sensor may detect a "load off" 504 event as the end of the external sensor event window 506. Within the window, features such as the number of RFID readings, RFID signal strength, tag identifications, and the temporal relationship between an RFID reading and an external sensor event may be used to detect stray RFID readings based on a model 310.

In one example embodiment of the present invention, under a model that the forklift lifts a pallet labeled with a locational RFID tag and merchandise labeled with product RFID tags from one location to another, stray RFID readings may be detected using external sensor information. FIG. 5(B) shows the recorded numbers of tag readings for tags A of a pallet, and tags B, C, and D of products (the numbers of readings are represented by an area for each tag) within the external sensor event window. In this example, tags A and B show a much higher number of RFID tag readings than tags C and D. Further, FIG. 5(C) shows the detected RF signal strengths for each RFID tag. In this example, tags A and B show consistently stronger RF signal strength than tags C and D. A determination that pallet A and product B are moved may be inferred based on the numbers of RFID tag readings and RF signal strength.

When target RFID tags are determined, they may be further correlated with locational RFID tags, e.g., a tag specifying a shelf or spot in the store. Based on the correlation between product tags and new locational tags, the RFID tag database may be updated to reflect the new placement of products or pallets in the store.

In one example embodiment of the present invention, external sensor events may be used to provide a trigger to the RFID scanner 138. For example, the scanner may start scanning for RF signals upon a determination of "load on" event detected by a proximity sensor, and stop scanning upon a determination of "load off" event. In this way, stray RFID readings may be limited.

Figure 4:
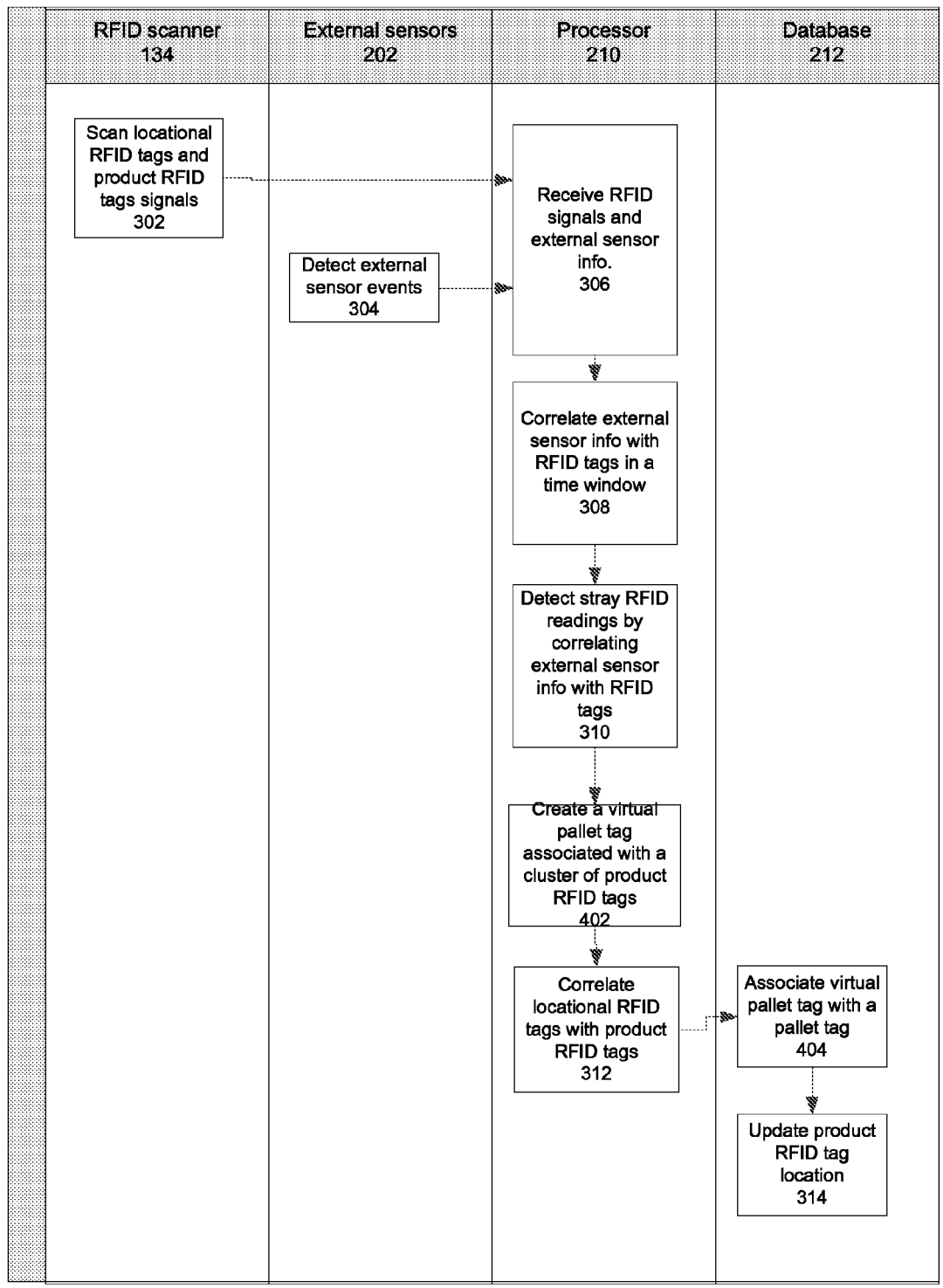
FIG. 4 shows an example RFID transport device sensor method of using a virtual pallet RFID tag derived from a group of product RFID tags for representing a pallet according to one example embodiment of the present invention.

Referring to FIG. 4 (in addition to steps provided for in FIG. 3), when a group of multiple product RFID tags on a pallet are detected and determined to be the target RFID tags, the group of tags may be further organized and assigned with a "virtual" pallet RFID tag 402. This may be helpful to determine product locations in situations where the pallet tag cannot be detected, e.g., out of range of the RFID scanner. A group of RFID product tags may be classified as a group based on readings of RFID tags and external sensor events. In one example embodiment, if several RFID tag readings exist after a pallet "load on" event, but before a pallet "load off" event, then these RFID tags may be assigned to a group and recorded as an associate group in the RFID database 404.

In one example embodiment of the present invention, an RFID product with the highest number of readings within the external sensor event window may be assigned as the virtual pallet RFID tag and stored in the RFID tag database as a key to the associated RFID tag group. Any subsequent pallet movement may also cause an update of the virtual RFID pallet tag in the RFID database.

A virtual RFID pallet tag may be associated with a group of RFID tags as a family tree, i.e., from parent to children. For example, if tag no. 3 is assigned as the virtual RFID pallet tag with respect to a group of tag nos. 1-8, tag no. 3 may be stored in a database as the parent of tag nos. 1-2, and 4-8. In this way, if later other RFID tags, e.g., tag nos. 9 and 10, are detected along with the group of RFID tags, tag nos. 9 and 10 may be removed from the pallet associated with the virtual pallet tag group because they are not a member of the family. Further, if tag nos. 2, 6-8 are sighted with a new locational RFID tag, the virtual pallet tag may be updated to be associated with the new location based on the information from tag nos. 2, 6-8.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A mobile sensor system for managing inventory of a store, comprising:
at least one radio frequency identification (RFID) scanner for receiving readings from RFID tags;
at least one external sensor for detecting external events other than RF signals from the RFID tags; and
a processor configured to:
determine a start of a time window based on a first external event detected by the at least one external sensor and an end of the time window based on a second external event detected by the at least one external sensor; and
detect stray readings based on the readings from the RFID tags acquired between the start and end of the time window.

2. The mobile sensor system of claim 1, wherein the mobile sensor system is situated on a transport device.

3. The mobile sensor system of claim 1, wherein the readings from the RF tags include at least one of a unique RFID tag identification and a radio frequency (RF) signal strength index.

4. The mobile sensor system of claim 1, wherein the RFID tags include product RFID tags for identifying products and locational RFID tags for identifying locations in the store.

5. The mobile sensor system of claim 4, wherein the RFID database includes relations between product RFID tags and locational RFID tags.

6. The mobile sensor system of claim 5, wherein a virtual pallet RFID tag is assigned to the product RFID tags to be stored in the RFID database, the virtual pallet RFID tag being determined based on the readings within the time window.

7. The mobile sensor system of claim 4, wherein the locations in the store include a shelf, a pallet and a ground area.

8. The mobile sensor system of claim 1, wherein the at least one external sensor includes at least one of a proximity sensor, a laser sensor and an accelerometer sensor.

9. The mobile sensor system of claim 1, wherein the at least one external event includes at least one of a load on and a load off a transport device detected at the at least one external sensor.

10. The mobile sensor system of claim 1, wherein the at least one external event includes at least one of a transport device moving forward, backward, and standing still detected at the at least one external sensor.

11. The mobile sensor system of claim 1, wherein the at least one external event includes a load-carrying part of a transport device being vertically above a threshold or being vertically below a threshold detected at the at least one external sensor.

12. The mobile sensor system of claim 1, wherein the start of the time window is based on a load on a transport device external event and the end of the time window is based on a load off the transport device external event.

13. The mobile sensor system of claim 1, wherein a number of the readings from the RFID tags within the time window determines which reading from an RFID tag is a stray reading.

14. The mobile sensor system of claim 1, further comprising:
- a data recording device for recording readings from RFID tags and the at least one external event; and
- a wireless data transmission link linking the data recording device to the processor.

15. The mobile sensor system of claim 1, wherein the store includes one of a retail store, a warehouse store, and a distribution center.

16. A method of using at least one RFID scanner and at least one external sensor other than the at least one RFID scanner for managing inventory of a store, comprising:
- receiving readings from RFID tags;
- detecting a first external event;
- determining a start of a time window based on the first external event detected by the at least one external sensor;
- detecting a second external event;
- determining an end of the time window based on the second external event detected by the at least one external sensor; and
- detecting stray readings based on the readings from the RFID tags acquired between the start and end of the time window.

17. The method of claim 16, wherein the start of the time window is based on a load on a transport device external event and the end of the time window is based on a load off the transport device external event.

18. A machine-readable non-transitory medium stored thereon executable codes that, when executed, performs a method of using at least one RFID scanner and at least one external sensor other than the at least one RFID scanner for managing inventory of a store, the method comprising:
- receiving readings from RFID tags;
- detecting a first external event;
- determining a start of a time window based on the first external event detected by the at least one external sensor;
- detecting a second external event;
- determining an end of the time window based on the second external event detected by the at least one external sensor; and
- detecting stray readings based on the readings from the RFID tags acquired between the start and end of the time window.

* * * * *